United States Patent Office 2,763,611
Patented Sept. 18, 1956

2,763,611

METHOD OF PREVENTING CORROSION OF IRON METALS

Calvin R. Breden, La Grange, Ill., assignor to the United States of America as represented by the United States Atomic Energy Commission No Drawing. Application July 6, 1954,
Serial No. 441,696

2 Claims. (Cl. 210—23)

This invention deals with a method of preventing the corrosion of iron and iron-base alloys when in contact with water, and in particular at elevated temperatures and/or superatmospheric pressures.

Iron metals (which term is to embrace hereinafter metallic iron as well as alloys containing iron as the predominant ingredient) were frequently found to be attacked by water, and in particular when under conditions of elevated temperatures and/or high pressures. Even stainless steels which have a very high corrosion resistance to water showed his phenomenon. For instance, equipment used for carrying out chemical reactions very often corroded when used with water at high temperatures and pressures.

It is an object of this invention to provide a process of reducing the corrosion of stainless steel by water, and in particular by water of elevated temperature and superatmospheric pressure.

It has been found that by adding hydrogen gas to the water, the corrosion of iron metals is completely prevented or at least reduced to a negligible amount. The quantity of hydrogen in the water should at least be 50 cc. per liter, but preferably is at least 400 cc. per liter. The improvement by the addition of hydrogen gas is accomplished on a great number of iron alloys and even on iron alone.

It is advantageous to add the hydrogen to the water prior to heating because the initial corrosion, in the absence of hydrogen, was found to be particularly high.

The chemism of the corrosion-preventive reaction and the part of the hydrogen therein are not known. Thermodynamic calculation of reactions of the water-iron system proved that the effect of the hydrogen cannot possibly be due to a reversal of a reaction in which $Fe_3O_4$ and hydrogen are formed, since for this about 30,000,000 cc. of hydrogen per liter of water would be necessary.

In the following, two examples are given for the purpose of illustrating the beneficial effect of hydrogen without the intention to have the invention limited to the details given in these examples.

*Example I*

The so-called 347-type stainless steel, which contains from 17 to 19% by weight of chromium and from 9 to 12% of nickel (remainder substantially iron), was tested as to corrosion; for this purpose water was flowed over the stainless steel sample at a velocity of 30 ft./sec. and a temperature of 260° C. Two parallel runs were made. The weight of the steel samples was determined in each case before the test and after a contact of 500 hours with the water. While the water in one run had been degassed prior to contact, the water of the second run contained hydrogen in a quantity of 500 cc./l. The stainless steel sample that was contacted with the degassed water experienced a weight loss of 0.06 mg./cm.$^2$/month and showed interference colors, predominantly red. The sample that was contacted with the hydrogen-containing water showed no change in appearance and had a weight loss of 0.01 mg./cm.$^2$/month.

*Example II*

A wire of pure iron was placed in a bomb of stainless steel, and water was introduced into the bomb and heated there to 315° C. Two parallel runs were carried out under identical conditions, except that in one instance the water had been degassed, while it contained 200 cc. of hydrogen per liter in the other instance. Again, the wire that had been contacted with the degassed water had a grayfish surface; it showed a weight increase of 0.1566 g. per 10.7882 g. of iron. In contradistinction thereto, the wire that had been in contact with the hydrogen-containing water proved to have lost 0.0022 g. per 7.9942 g. of iron; it still had its shiny black surface and no deposit thereon.

It will be understood that this invention is not to be limited to the details given herein but that it may be modified within the scope of the appended claims.

What is claimed is:

1. The process of reducing the corrosion of iron metals when in contact with water at temperatures above room temperature and superatmospheric pressure, comprising adding hydrogen gas to the water in a quantity of at least 50 cc. (STP) per liter before contacting the water with the iron metal at superatmospheric pressure.

2. The process of claim 1 wherein the hydrogen is added in a quantity of 400 cc. (STP) per liter.

References Cited in the file of this patent

Benedicke et al.: "The Journal of the Iron and Steel Institute," vol. CXIV, No. 11, 1926, pages 185–186.

"Water Treatment for Ind. and Other Uses" (Nordell), Rheinhold Pub. Corp., N. Y., 1951, pages 92–94.